(12) United States Patent
Gros

(10) Patent No.: US 7,929,378 B2
(45) Date of Patent: Apr. 19, 2011

(54) CONTAINER ASSEMBLY FOR TRANSPORT AND HANDLING OF SEISMIC SOURCE ARRAYS INCLUDING A BASIC STRUCTURE AND REMOVABLE HANDLES, AND METHOD OF USE

(75) Inventor: Michel Gros, La Roquebrussanne (FR)

(73) Assignee: Sercel, Carquefou (FR)

( * ) Notice: Subject to any disclaimer, the term of this patent is extended or adjusted under 35 U.S.C. 154(b) by 852 days.

(21) Appl. No.: 11/764,984

(22) Filed: Jun. 19, 2007

(65) Prior Publication Data
US 2007/0291587 A1    Dec. 20, 2007

(30) Foreign Application Priority Data
Jun. 20, 2006   (FR) ...................................... 06 05490

(51) Int. Cl.
*G01V 1/38* (2006.01)
(52) U.S. Cl. ........................................................ 367/173
(58) Field of Classification Search .................... 367/16, 367/20, 173
See application file for complete search history.

(56) References Cited

U.S. PATENT DOCUMENTS

| 4,721,180 A | * | 1/1988 | Haughland et al. ............. 367/16 |
| 2007/0291587 A1 | * | 12/2007 | Gros ................................ 367/16 |

FOREIGN PATENT DOCUMENTS

| DE | 20206367 | | 9/2002 |
| EP | 1279621 | | 1/2003 |
| EP | 1870733 A2 | * | 12/2007 |
| FR | 2902528 A1 | * | 12/2007 |
| GB | 2393435 | | 3/2004 |

\* cited by examiner

*Primary Examiner* — Dan Pihulic
(74) *Attorney, Agent, or Firm* — Pauly, Devries Smith & Deffner, L.L.C.

(57) ABSTRACT

An assembly for forming a container for transport and handling of at least two marine seismic source arrays, wherein said arrays each include at least one series of units formed by at least two marine seismic sources, characterized in that it includes a basic structure including a floor and a ceiling connected by central posts extending in a substantially central plane with respect to said floor and said ceiling, and lateral posts intended to removably connect the lateral ends of said floor and the lateral ends of said ceiling.

7 Claims, 4 Drawing Sheets

CONTAINER ASSEMBLY FOR TRANSPORT AND HANDLING OF SEISMIC SOURCE ARRAYS INCLUDING A BASIC STRUCTURE AND REMOVABLE HANDLES, AND METHOD OF USE

RELATED APPLICATIONS

This application claims priority to French Patent Application No. FR 06/05490, filed on Jun. 20, 2006, which is hereby incorporated by reference in its entirety.

FIELD OF THE INVENTION

The field of the invention is that of the acquisition of seismic data. More specifically, the invention relates to equipment for analyzing sea beds.

BACKGROUND OF THE INVENTION

The invention relates in particular to the industry of oil exploration by the seismic method, but can be applied to any field implementing a seismic data acquisition network in a marine environment. In the field of the invention, the geophysical data acquisition operations implemented on site conventionally use networks of sensors (designated by the term "hydrophone" for data acquisition in a marine environment). To collect geophysical data in a marine environment, one or more submerged seismic sources are activated to propagate omnidirectional seismic wave trains.

Currently, the sources implemented to perform marine seismic studies are air guns. These air guns are arranged in arrays and are towed behind the research vessel. An array includes a float; a control case, called an umbilical, integrating in particular a pneumatic duct to supply the air guns, a line for transmitting a gun synchronisation signal, etc.; and a series of air guns. The air guns have an acoustic "signature." In some cases, it is necessary to increase the acoustic power of the source. To do this, a solution consists of producing units formed by two or even three air guns, parallel or in line.

Improved containers and techniques for transporting such arrays are needed.

SUMMARY OF THE INVENTION

One aspect of the invention relates to a container assembly for transport handling at least two marine seismic source arrays, where the arrays each include at least one series of units formed by at least two marine seismic sources. The container assembly includes a basic structure having a floor and a ceiling connected by central posts that extend in a substantially central plane with respect to said floor and said ceiling. The container assembly further includes lateral posts intended to removably connect lateral ends of the floor and lateral ends of the ceiling.

Another aspect of the invention relates to a method for transport handling at least two marine seismic source arrays, where the arrays each include at least one series of units formed by at least two marine seismic sources. The method includes providing a basic structure having a floor and a ceiling connected by central posts that extend in a substantially central plane with respect to said floor and said ceiling, and providing lateral posts intended to removably connect the lateral ends of the floor and the lateral ends of the ceiling. The method further includes inserting the arrays between the ceiling and the floor, wherein the lateral posts are disassembled so that at least one of the seismic sources can extend beyond the width of the basic structure. The method also includes confining the arrays in the basic structure so that the arrays are located in the width of the basic structure, and attaching the lateral arrays to the basic structure.

The invention may be more completely understood by considering the detailed description of various embodiments of the invention that follows in connection with the accompanying drawings.

Figure 1:
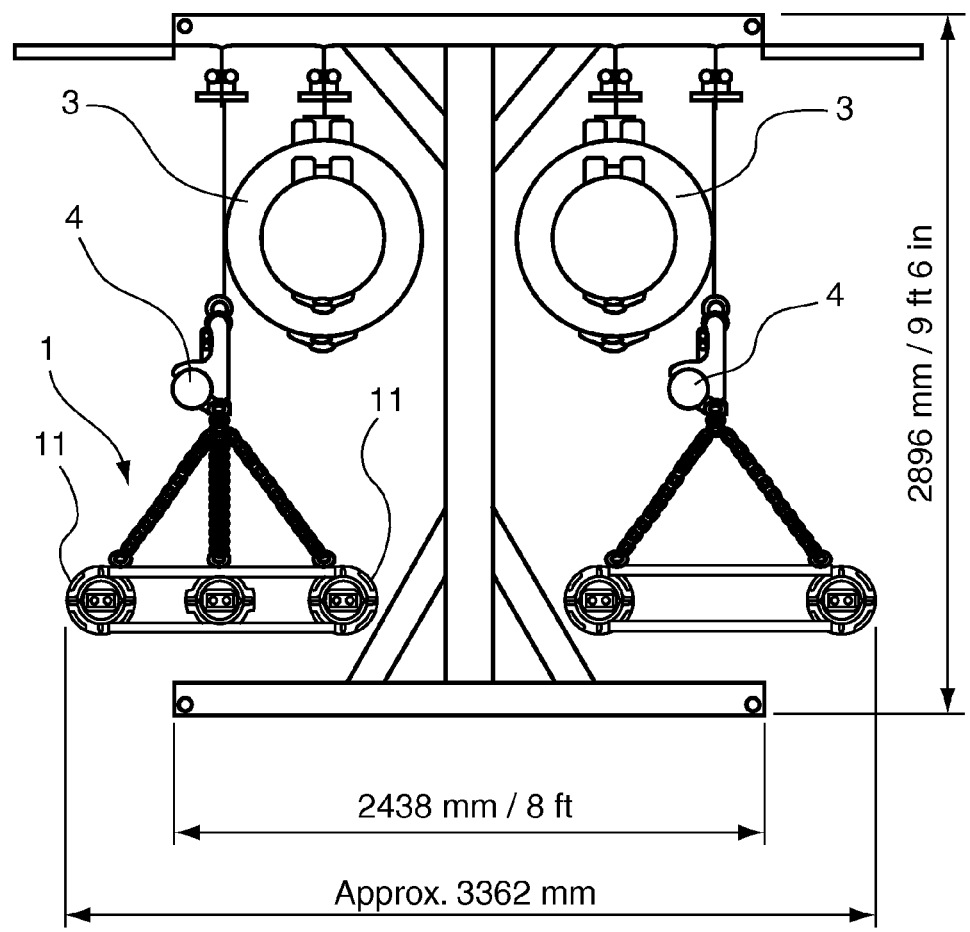
FIG. 1 is a view of a longitudinal end of a basic structure of an assembly for forming a container according to the invention, wherein the arrays are in a deployed position.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

The invention relates to the transport of arrays including a series of units (conventionally five units) of air guns (or more generally marine seismic sources), in particular but not exclusively parallel.

In the field of the invention, the substantial increase in activity associated with offshore exploration has led contractors to massively invest in new boats dedicated to seismics. However, the construction of these boats is time-consuming and costly. Simultaneously, the growing needs of the market drive the need to implement more boats. It therefore appears to be desirable to have seismic sources that can be easily transported from one study site to another so that they can be installed on supply boats. These supply boats thus equipped become source boats making it possible to perform various seismic studies such as undershoot studies, OBC (Ocean Bottom Cable) studies, for example, and so on.

As mentioned above, these seismic sources are generally composed of air guns (but can be of another type) and are installed in arrays composed of a plurality of air guns, parallel or in line. This arrangement makes it possible to increase the level of energy emitted by the source and to respond to the acoustic characteristics required by the end customer (oil company).

However, as shown in FIG. 1, a parallel arrangement of air guns 11 involves units 1 having a large width, which is bulky (around 3.3 m), when two arrays are placed side-by-side, which cannot be inserted in standard containers (satisfying the ISO standard 668). Indeed, a container ISO 668 can have three different lengths: 20 feet (6,096 m), 40 feet (12,192 m) or 45 feet (13,716 m), two different heights: a standard (8 feet, 6 inches=2,591 m) and a so-called "High Cube" (2,896 m=9 feet, 6 inches), but still has the same standard external width of 2,438 m (8 feet). It is noted that the problem of bulk can also arise in different arrangements, in particular in the case of in-line arrangements of the seismic sources.

However, in general, the advantages of transporting the arrays in a container are that time is saved for the customer (no significant mobilization or demobilization, related for example to the assembly of arrays); no additional array handling means to be provided by the customer because included in the container (rails, winch, lifting means, etc.); and the possibility of using available boats (supply boat) on the area of study, which will be used as source boats. However, the need to use containers of which the width exceeds that of ISO containers involves a certain number of disadvantages, some of which are the requirement of chartering of special boats (the number of these boats enabling non-ISO containers to be transported is limited); the use of special seaways; access to a limited number of ports; and having to travel on the road with an excessive load. Of course, these constraints tend to considerably increase the cost of transport.

However, the prior art currently offers no solution for transporting, without a substantial increase in cost, marine seismic source arrays arranged in parallel by pairs. Of course, it would be possible to have only a single array for each container, but this would make it necessary to double the number of containers, which would also involve an increase in the transport costs, as well as the bulk and weight on board the supply boats. Moreover, another constraint in the design of containers is associated with the CSC (Convention for Safe Container) certification, which relates to the fact that the containers must be stackable (placed one on top of another) and the mechanical strength of the container.

The invention is intended in particular to overcome the disadvantages of the prior art. More specifically, the invention is intended to propose a technique for transporting parallel marine seismic source arrays that enable the transport costs to be reduced. The invention is also intended to provide such a technique that is adapted to the constraints imposed with regard to both the dimensions and the mechanical strength of the containers. The invention is also intended to provide such a technique that allows for easy handling of the arrays. Another objective of the invention is to provide such a technique with a simple design that is easy to implement.

It is thus possible to design a basic structure having, from an end view, a general I-shape, i.e. not closed on its lateral sides. It is thus also possible to insert two arrays into the basic structure, which arrays are in a configuration in which they occupy, one next to the other, a wider space than the width of the ISO containers mentioned above. Once the arrays have been inserted, they can then be confined to the width of the basic structure. The lateral posts are then attached to the basic structure in order to reinforce it, so that, ultimately, the container thus constituted satisfies the aforementioned requirements of mechanical strength imposed by the CSC certification.

In other words, the invention consists of proposing a basic structure that is optimally sized in terms of ISO standard 668, but not strong enough in terms of the CSC certification (due to the fact that its lateral sides are open to allow the insertion of the arrays in a bulk configuration), and of providing the means for reinforcing the basic structure once the arrays have been properly placed in it (i.e. in a space-saving configuration).

According to an advantageous solution, the ceiling has, on each side of the central posts, support means for at least one array. In this case, the support means are mounted so as to be capable of moving with respect to the ceiling between a transport position in which they are located between the ceiling and the floor and an removal/insertion position in which they extend at least partially outside of the space between the ceiling and the floor. The container thus constituted has means facilitating handling of the arrays.

The support means advantageously include, on each side of the central posts, at least one rail member mounted so as to slide longitudinally on the ceiling. Of course, other sliding means can be implemented according to other embodiments that can be envisaged, for example carriages. The support means preferably include, on each side of the central posts, at least two rail members mounted so as to slide longitudinally on the ceiling, wherein one of the rail members supports the marine seismic sources and the other of the rail members supports at least one float that each array includes.

According to another feature, the floor and/or the ceiling include(s) a frame reinforced by a beam grid structure. According to another feature, at least two knee braces connect the central posts to the floor and/or the ceiling. According to another feature, the central posts are connected two-by-two by at least one beam forming a grid structure with the central posts.

As indicated above, the principle of the invention is passed on the design of a container for seismic source arrays in the form of a basic structure with open lateral sides, on which reinforcing posts are attached once the arrays have been installed.

Figure 2:
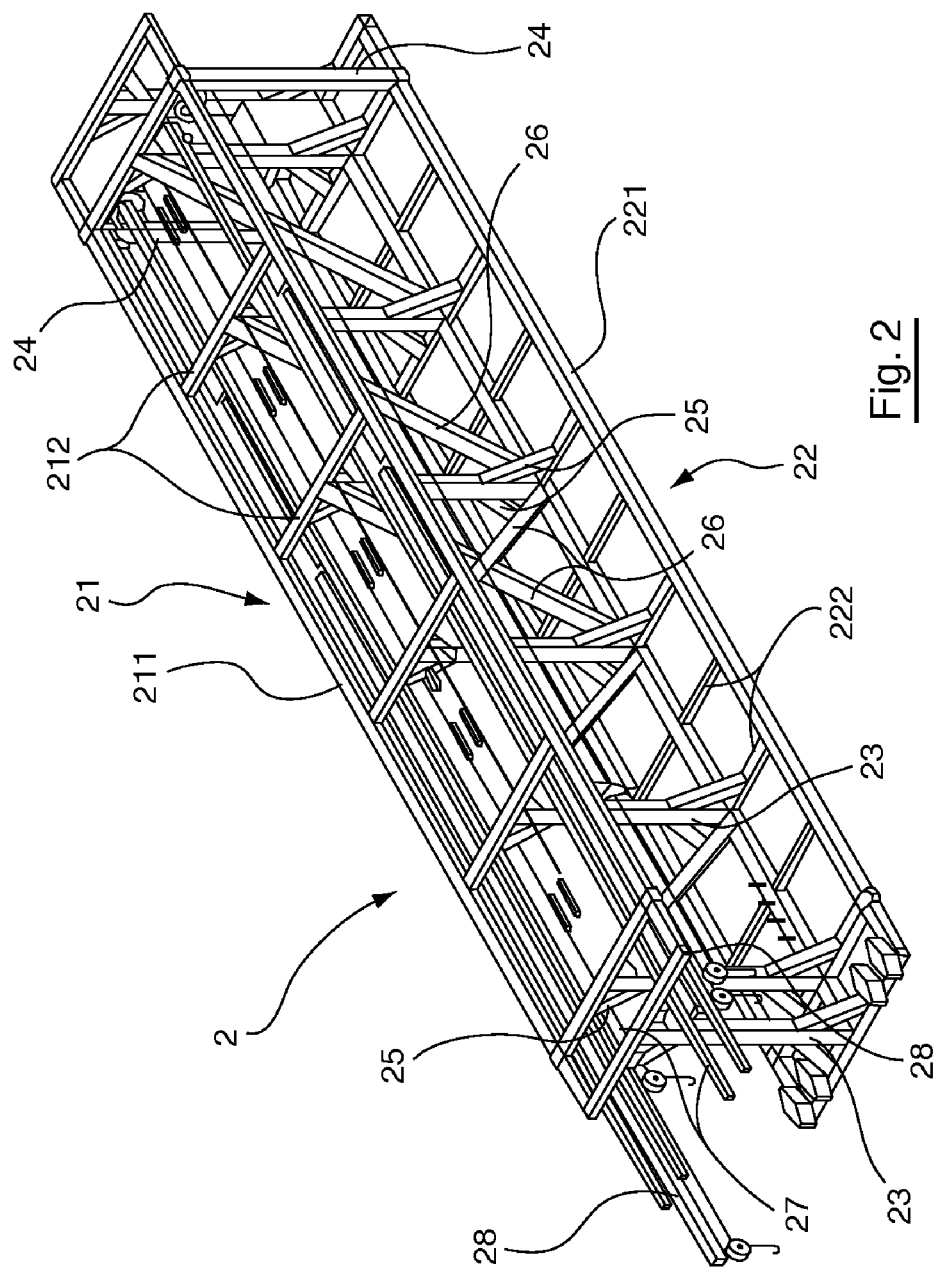
FIG. 2 is a perspective view of a basic structure of an assembly for forming a container according to the invention.

FIG. 2 is a perspective view of a basic structure 2 of an assembly for forming a container according to the invention. Such a basic structure is composed of a ceiling 21 and a floor 22 connected by a series of central posts 23. The posts 23 are arranged and extend in a plane orthogonal to the floor and the ceiling, which plane is substantially central with respect to the floor and the ceiling. As shown, the lateral ends of the ceiling and the floor are not connected to one another so that the lateral sides of the basic structure are open. The basic structure has a general I-shape at one end.

It is noted that the lateral posts 24 can optionally be permanently mounted on the basic structure, in the vicinity of a longitudinal end thereof. This end then constitutes a rear end of the structure, and the arrays are inserted longitudinally at the opposite end as explained in greater detail below.

The floor and the ceiling are preferably each constituted by a metal frame, respectively 211, 221, reinforced by a plurality of transverse beams, respectively 212, 222. In addition, the central posts are connected to the floor and the ceiling by knee braces 25, by means of transverse beams 212, 222. Reinforcing beams 26 are also attached between the central posts so as to form a grid structure with them.

Moreover, for each array (i.e. on each side of the central posts 23), the basic structure has support means provided, according to this embodiment, so as to be capable of moving with respect to the ceiling between a transport position and a position of removal/insertion of the arrays. It is noted that an array includes (as seen in FIG. 1) a float 3; a control case 4 (conventionally designated by the term "umbilical," connected to the float and in which pneumatic control ducts and electrical signal transmission means pass); and seismic source 11 units 1, in this case parallel, suspended from the case 4. These support means preferably include, for each array, (as seen in FIG. 2) a sliding rail member 27 for supporting the float; and a sliding rail member 28 for supporting the control case itself supporting the units 1.

To install two air gun arrays in a container ISO 668, the invention therefore proposes a basic I-shaped structure, of which the lateral sides are open. The hand-rail members 27, 28 are deployed longitudinally outside of the basic structure, and the arrays are hooked to the rails. When the system is placed in the basic structure, a part of the equipment is located outside of the basic structure. This arrangement in no way interferes with the storage of the container on ships when the system is removed from the water and reinserted into the container.

The rail members 27, 28 are then slid toward the inside of the basic structure. The air gun arrays are then positioned on each side of the central posts 23 of the basic structure, and the air guns, parallel according to the example shown, extend in a position according to which the corresponding units extend in a substantially horizontal plane as shown in FIG. 1.

Figure 3:
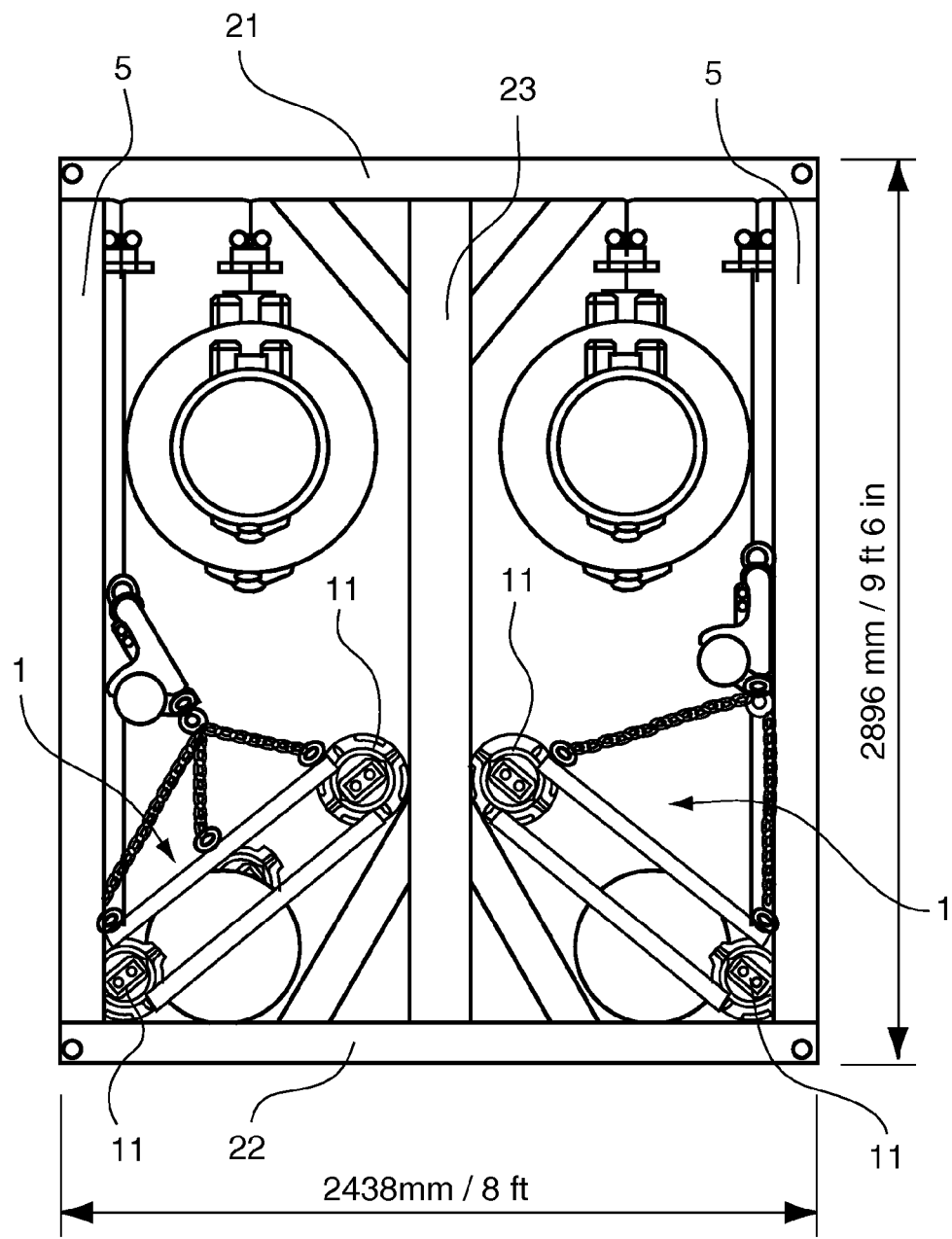
FIG. 3 is a view of a longitudinal end of a basic structure of an assembly for forming a container according to the invention, wherein the arrays occupy a confined position.

To transport the arrays, they are confined to the inside of the basic structure as shown in FIG. 3. For this, the units are tilted so that, according to the example of FIG. 3, one of the guns 11 of the unit 1 rests on the floor while the other gun 11 is arranged against a central post 23. As the units are capable of pivoting about the shaft holding the chains of the units 1 on the case 4, it is easy to attach the guns to one of the beams forming the central structure. This operation is performed manually. It is possible, however, to connect each unit to a hand-line, with said lines being connected to a rope that makes it possible to automatically confine the air guns to the inside of the container.

Figure 4:
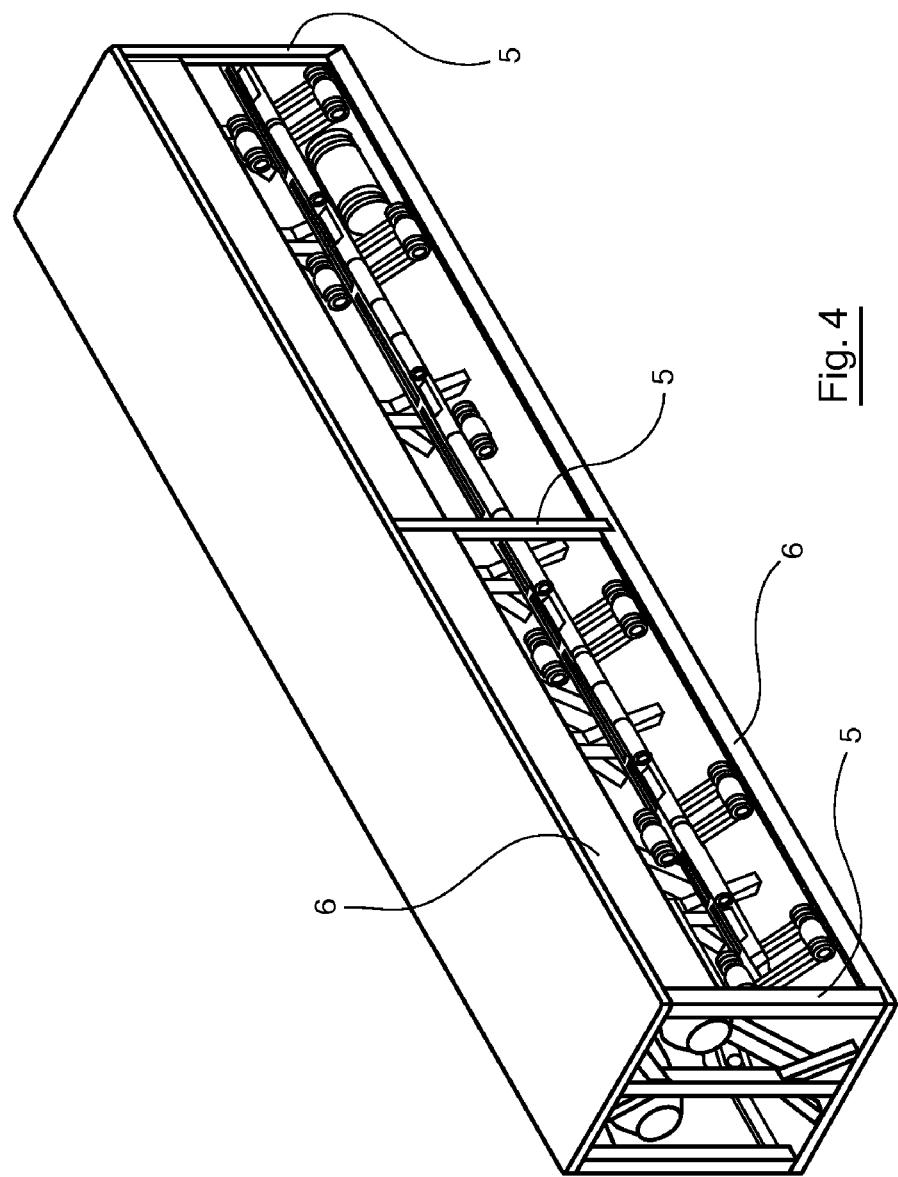
FIG. 4 is a perspective view of a container formed using an assembly according to the invention, in a transport configuration.

Once the arrays have been confined to the basic structure, said structure is reinforced by lateral posts 5 attached to the basic structure so as to connect the frame of the floor and that of the ceiling. An example of the container obtained is shown in FIG. 4. The number of lateral posts, as well as their arrangement, can be adjusted according to the desired rigidity. High and low walls 6 can also be attached to the lateral sides of the container. To remove the arrays, the lateral posts are disassembled and the units 1 are unhooked from the structure so as to enable them to adopt the configuration shown in FIG. 1.

The invention also includes a method for transport handling at least two marine seismic source arrays, where the arrays each include at least one series of units formed by at least two marine seismic sources. The method includes providing a basic structure having a floor and a ceiling connected by central posts that extend in a substantially central plane with respect to said floor and said ceiling, and providing lateral posts intended to removably connect the lateral ends of the floor and the lateral ends of the ceiling. The method further includes inserting the arrays between the ceiling and the floor, wherein the lateral posts are disassembled so that at least one of the seismic sources can extend beyond the width of the basic structure. The method also includes confining the arrays in the basic structure so that the arrays are located in the width of the basic structure, and attaching the lateral arrays to the basic structure. In some embodiments, the method further includes attaching the seismic sources to the central posts or to means attached to the central posts.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A container assembly for transport handling at least two marine seismic source arrays, wherein said arrays each include at least one series of units formed by at least two marine seismic sources, the container assembly comprising:
   (i) a basic structure including a floor and a ceiling connected by central posts extending in a substantially central plane with respect to said floor and said ceiling, wherein said ceiling has on each side of said central posts support means of at least one array; and wherein said support means are mounted so as to be capable of moving with respect to said ceiling between a transport position in which they are located between the ceiling and said floor and a removal/insertion position in which they extend at least partially outside of the space between the ceiling and said floor; and wherein said support means include, on each side of said central posts, at least one rail member mounted so as to slide longitudinally on said ceiling; and
   (ii) lateral posts intended to removably connect lateral ends of said floor and lateral ends of said ceiling.

2. The container assembly of claim 1, where said support means include, on each side of said central posts, at least two rail members mounted so as to slide longitudinally on said ceiling, wherein one of said rail members supports said marine seismic sources and the other of said rail members supports at least one float included in each array.

3. The container assembly of claim 1, where said floor or said ceiling include a frame reinforced by a beam grid structure.

4. The container assembly of claim 3, having at least two knee braces that connect said central posts to said floor or said ceiling.

5. The container assembly of claim 4, where said central posts are connected two-by-two by at least one beam forming a grid structure with said central posts.

6. A method for transport handling at least two marine seismic source arrays, wherein said arrays each include at least one series of units formed by at least two marine seismic sources, the method comprising:
   (i) providing a basic structure including a floor and a ceiling connected by central posts extending in a substantially central plane with respect to said floor and said ceiling, wherein said ceiling has on each side of said central posts support means of at least one array; and wherein said support means are mounted so as to be capable of moving with respect to said ceiling between a transport position in which they are located between the ceiling and said floor and a removal/insertion position in which the extend at least partially outside of the space between the ceiling and said floor; and wherein said support means include, on each side of said central posts, at least one rail member mounted so as to slide longitudinally on said ceiling;
   (ii) providing lateral posts intended to removably connect lateral ends of said floor and lateral ends of said ceiling;
   (iii) inserting said arrays between said ceiling and said floor, wherein said lateral posts are disassembled so that at least one of said seismic sources can extend beyond the width of said basic structure;
   (iv) confining said arrays in said basic structure so that said arrays are located in the width of said basic structure; and
   (v) attaching said lateral arrays to said basic structure.

7. The method of claim 6, further comprising attaching said seismic sources to said central posts or to means attached to central posts.

* * * * *